(12) United States Patent
Choi

(10) Patent No.: US 11,629,539 B2
(45) Date of Patent: Apr. 18, 2023

(54) VEHICLE DOOR OPENING AND CLOSING APPARATUS

(71) Applicants: Hyundai Motor Company, Seoul (KR); Kia Motors Corporation, Seoul (KR)

(72) Inventor: Je Won Choi, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 428 days.

(21) Appl. No.: 16/825,883

(22) Filed: Mar. 20, 2020

(65) Prior Publication Data

US 2021/0140215 A1 May 13, 2021

(30) Foreign Application Priority Data

Nov. 12, 2019 (KR) .......................... 10-2019-0144597

(51) Int. Cl.
| | | |
|---|---|---|
| *E05D 15/48* | (2006.01) | |
| *E05D 15/10* | (2006.01) | |
| *B60J 5/04* | (2006.01) | |
| *B60J 5/06* | (2006.01) | |

(52) U.S. Cl.
CPC .............. *E05D 15/48* (2013.01); *B60J 5/047* (2013.01); *E05D 15/101* (2013.01); *B60J 5/06* (2013.01); *E05D 2015/485* (2013.01); *E05Y 2900/532* (2013.01)

(58) Field of Classification Search
CPC ......................... E05D 2015/485; E06B 3/5072
See application file for complete search history.

(56) References Cited

U.S. PATENT DOCUMENTS

| | | | | | |
|---|---|---|---|---|---|
| 3,834,081 | A | * | 9/1974 | Catlett .................. | E05F 15/643 49/327 |
| 5,394,648 | A | * | 3/1995 | Kordes .................. | E05D 15/48 49/177 |
| 6,058,665 | A | * | 5/2000 | Halvorson, Jr. ........ | E06B 1/524 49/260 |
| 6,161,336 | A | * | 12/2000 | Ziv-Av .................... | E05D 15/58 49/260 |
| 6,851,743 | B2 | * | 2/2005 | George .................. | E05D 15/48 49/260 |
| 6,860,543 | B2 | * | 3/2005 | George .................. | B60J 5/0479 49/248 |
| 7,000,977 | B2 | * | 2/2006 | Anders .................. | E05D 15/58 49/248 |

(Continued)

FOREIGN PATENT DOCUMENTS

| | | |
|---|---|---|
| DE | 2105658 A1 * | 8/1972 |
| DE | 3814564 A1 * | 4/1988 |

(Continued)

*Primary Examiner* — Catherine A Kelly
(74) *Attorney, Agent, or Firm* — Fox Rothschild LLP

(57) ABSTRACT

A vehicle door opening and closing apparatus includes: a vehicle door; a rail mounted on a vehicle body; and a roller unit mounted on the vehicle door, and configured to move along the rail, where the roller unit allows the vehicle door to open and close in either a sliding mode, in which the vehicle door slides along the rail, or a swing mode, in which the vehicle door swings in a predetermined position of the rail.

16 Claims, 23 Drawing Sheets

(56) References Cited

U.S. PATENT DOCUMENTS

| | | | | |
|---|---|---|---|---|
| 7,104,588 | B2* | 9/2006 | George | E05D 15/1081 49/248 |
| 8,646,208 | B2* | 2/2014 | Taracko | B60J 5/047 49/155 |
| 8,919,338 | B2* | 12/2014 | McNamee | E05D 15/582 126/192 |
| 9,637,970 | B1* | 5/2017 | Rendon, Jr. | E05D 15/48 |
| 9,718,331 | B2* | 8/2017 | Maruyama | B60J 5/06 |
| 9,731,583 | B2* | 8/2017 | Maruyama | B60J 5/047 |
| 9,822,579 | B2* | 11/2017 | Maruyama | B60J 5/047 |
| 9,896,839 | B2* | 2/2018 | Hilliaho | E05D 15/0604 |
| 10,280,678 | B1* | 5/2019 | Rendon, Jr. | E05D 15/54 |
| 10,518,616 | B2* | 12/2019 | Houmani | E05D 15/48 |
| 2003/0218358 | A1* | 11/2003 | Hahn | B60J 5/047 296/155 |
| 2021/0140216 | A1* | 5/2021 | Choi | B60J 5/0477 |
| 2021/0170839 | A1* | 6/2021 | Choi | E05D 15/0604 |
| 2021/0170842 | A1* | 6/2021 | Choi | E05D 15/1047 |
| 2021/0172235 | A1* | 6/2021 | Choi | E05F 15/619 |
| 2021/0172236 | A1* | 6/2021 | Choi | E05F 15/619 |
| 2021/0172237 | A1* | 6/2021 | Choi | E05F 15/655 |
| 2022/0090421 | A1* | 3/2022 | Choi | E05B 85/245 |
| 2022/0090427 | A1* | 3/2022 | Choi | E05D 15/48 |

FOREIGN PATENT DOCUMENTS

| | | | | |
|---|---|---|---|---|
| DE | 102005010674 A1 * | 9/2006 | | B60J 5/062 |
| DE | 102010055442 A1 * | 6/2012 | | B60J 5/0477 |
| WO | WO-2012047179 A1 * | 4/2012 | | E05D 15/0604 |

* cited by examiner

VEHICLE DOOR OPENING AND CLOSING APPARATUS

CROSS-REFERENCE TO RELATED APPLICATION

This application claims under 35 U.S.C. § 119(a) the benefit of Korean Patent Application No. 10-2019-0144597, filed on Nov. 12, 2019 in the Korean Intellectual Property Office, the entire contents of which are incorporated by reference herein.

BACKGROUND

(a) Technical Field

The present disclosure relates to a vehicle door opening and closing apparatus, more particularly, to the vehicle door opening and closing apparatus configured to operate in a swing mode or a sliding mode.

(b) Description of the Related Art

Vehicles have door apertures that enable vehicle passengers to enter and exit from a passenger compartment in the vehicle. A vehicle door is closed to block the door aperture and is opened to enable ingress and egress of passengers to and from the passenger compartment through the door aperture. Different types of vehicle doors include swing doors and sliding doors. The swing door is opened and closed by swinging around a hinge mounted between the swing door and a vehicle body. The sliding door is opened and closed by sliding a roller mounted on the sliding door along a rail mounted on the vehicle body.

The swing door is very easy to open and close, thereby enabling quick ingress and egress of passengers. However, when the swing door is opened, a space for ingress and egress is relatively small. When the vehicle is located in a narrow space, a swing trajectory of the door may make the opening and closing operation thereof difficult.

The sliding door is very easy to open and close even when the vehicle is located in a narrow space. When the sliding door is opened, a space for ingress and egress is relatively large. However, the sliding door requires more force and time to open and close, as compared to the swing door, which hinders quick ingress and egress of passengers.

According to the related art, as a vehicle door is operated by a single opening and closing method, it may be difficult to provide an appropriate type of door for different types of users or in different situations.

The above information described in this background section is provided to assist in understanding the background of the inventive concept, and may include any technical concept which is not considered as the prior art that is already known to those skilled in the art.

SUMMARY

An aspect of the present disclosure provides a vehicle door opening and closing apparatus allowing a vehicle door to open and close in either a swing mode or a sliding mode, thereby satisfying user need.

According to an aspect of the present disclosure, a vehicle door opening and closing apparatus may include: a vehicle door; a rail mounted on a vehicle body; and a roller unit mounted on the vehicle door, and configured to move along the rail, wherein the roller unit may allow the vehicle door to open and close in either a sliding mode, in which the vehicle door slides along the rail, or a swing mode, in which the vehicle door swings in a predetermined position of the rail. Other possible modes for opening and closing the vehicle door are encompassed by the claimed invention, and in particular, the roller unit allows the vehicle door to open and close in one mode selected from all of the possible modes.

The roller unit may have a rotation axis and include a hold lock, and the roller unit may be releasably held in the predetermined position of the rail by the hold lock. The vehicle door may swing around the rotation axis when the roller unit is held in the predetermined position of the rail by the hold lock, and the vehicle door may slide along the rail when the roller unit is released by the hold lock.

The roller unit may include a roller bracket having a roller configured to roll along the rail, and a body connecting the roller bracket and the vehicle door.

The body may include a first end portion to which the roller bracket is connected, and a second end portion to which the vehicle door is connected.

The first end portion of the body may be pivotally connected to the roller bracket through a pivot pin, and the rotation axis may be defined by the pivot pin.

The body may have a pivot lug protruding from the first end portion toward the roller bracket, and the pivot lug may be pivotally connected to the roller bracket through the pivot pin.

The second end portion of the body may be fixed to the vehicle door.

The first end portion of the body may be fixed to the roller bracket.

The second end portion of the body may be pivotally connected to the vehicle door through a pivot pin, and the rotation axis may be defined by the pivot pin.

The vehicle door may have a pivot lug protruding toward the body, and the second end portion of the body may be pivotally connected to the pivot lug through the pivot pin.

The vehicle door opening and closing apparatus may further include: a center rail extending from an edge of a door aperture of the vehicle body; and a center roller unit guided along the center rail, wherein the center roller unit may be mounted on a rear end of the vehicle door.

The center rail may include a sliding guide configured to guide the center roller unit when the vehicle door slides in the sliding mode, and a swing guide configured to guide the center roller unit when the vehicle door swings in the swing mode.

The sliding guide may extend in a longitudinal direction of a vehicle, and the swing guide may extend toward an interior space of the vehicle.

The sliding guide may have a stopper wall configured to prevent the center roller unit from being separated from the sliding guide.

The swing guide may have a guide projection configured to guide a movement of the center roller unit.

The center rail may include a space allowing the center roller unit to be released from the center rail or be held in the center rail when the vehicle door swings in the swing mode, and the space may be defined between the stopper wall and the guide projection.

An angle of intersection between an axis of the sliding guide and an axis of the swing guide may be an obtuse angle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
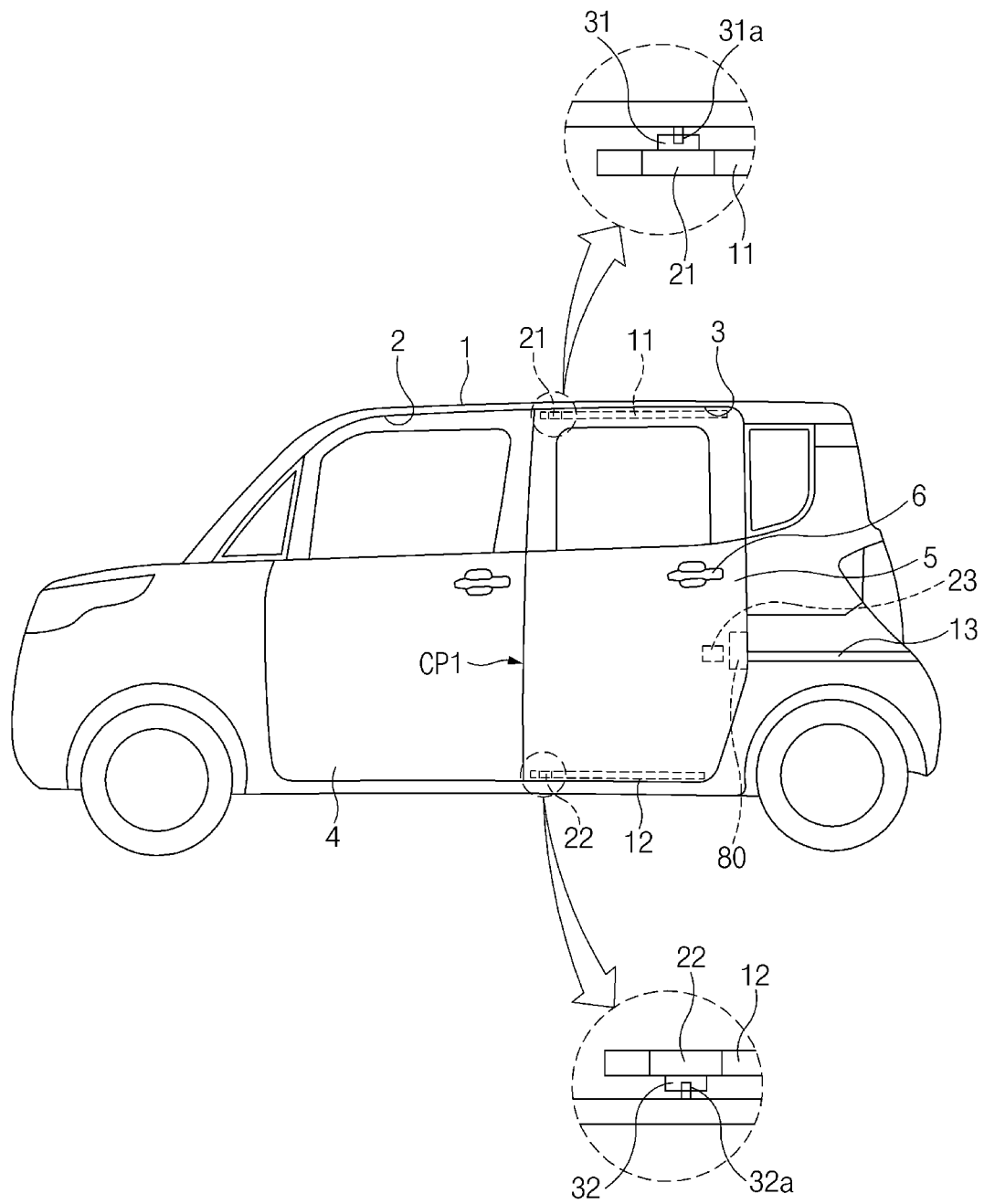
FIG. 1 illustrates a vehicle door opening and closing apparatus according to an exemplary embodiment of the present disclosure, which is mounted on a rear door of a vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicle door opening and closing apparatus, according to exemplary embodiments of the present disclosure, may allow a vehicle door to open and close selectively in any one mode of a plurality of modes, such as either a sliding mode or a swing mode. In other words, the vehicle door opening and closing apparatus, according to exemplary embodiments of the present disclosure, may be a transformable-type door opening and closing apparatus. The sliding mode may allow the vehicle door to open and close by sliding in a longitudinal direction of a vehicle, and the swing mode may allow the vehicle door to open and close by swinging inwards and outwards.

Referring to FIG. 1, a vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 covering and uncovering the front aperture 2, and a rear door 5 covering and uncovering the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

The vehicle door opening and closing apparatus, according to exemplary embodiments of the present disclosure, may be applied to the front door 4, the rear door 5, and the like. FIGS. 1 to 16 illustrate a vehicle door opening and closing apparatus according to an exemplary embodiment of the present disclosure, which is applied to the rear door 5. Hereinafter, the rear door 5 will be referred to as the vehicle door 5, and the rear aperture 3 will be referred to as the door aperture 3.

The vehicle door opening and closing apparatus according to an exemplary embodiment of the present disclosure may include one or more rails 11 and 12 mounted on the vehicle body 1, and the rails 11 and 12 may extend in the longitudinal direction of the vehicle. Referring to FIG. 1, an upper rail 11 may be mounted on an upper edge of the vehicle body 1, and a lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus according to an exemplary embodiment of the present disclosure may include roller units 21 and 22 guided along the rails 11 and 12. The roller units 21 and 22 may allow the vehicle door 5 to open and close in either the sliding mode or the swing mode. In particular, the roller units 21 and 22 may be releasably held in predetermined positions of the rails 11 and 12 by hold locks 31 and 32. Specifically, when the roller units 21 and 22 are held in the predetermined positions of the rails 11 and 12 by the hold locks 31 and 32, the vehicle door 5 may be opened and closed in the swing mode in which the vehicle door swings in the predetermined positions of the rails 11 and 12. When the roller units 21 and 22 are released by the hold locks 31 and 32, the vehicle door 5 may be opened and closed in the sliding mode in which the vehicle door slides along the rails 11 and 12.

Figure 3:
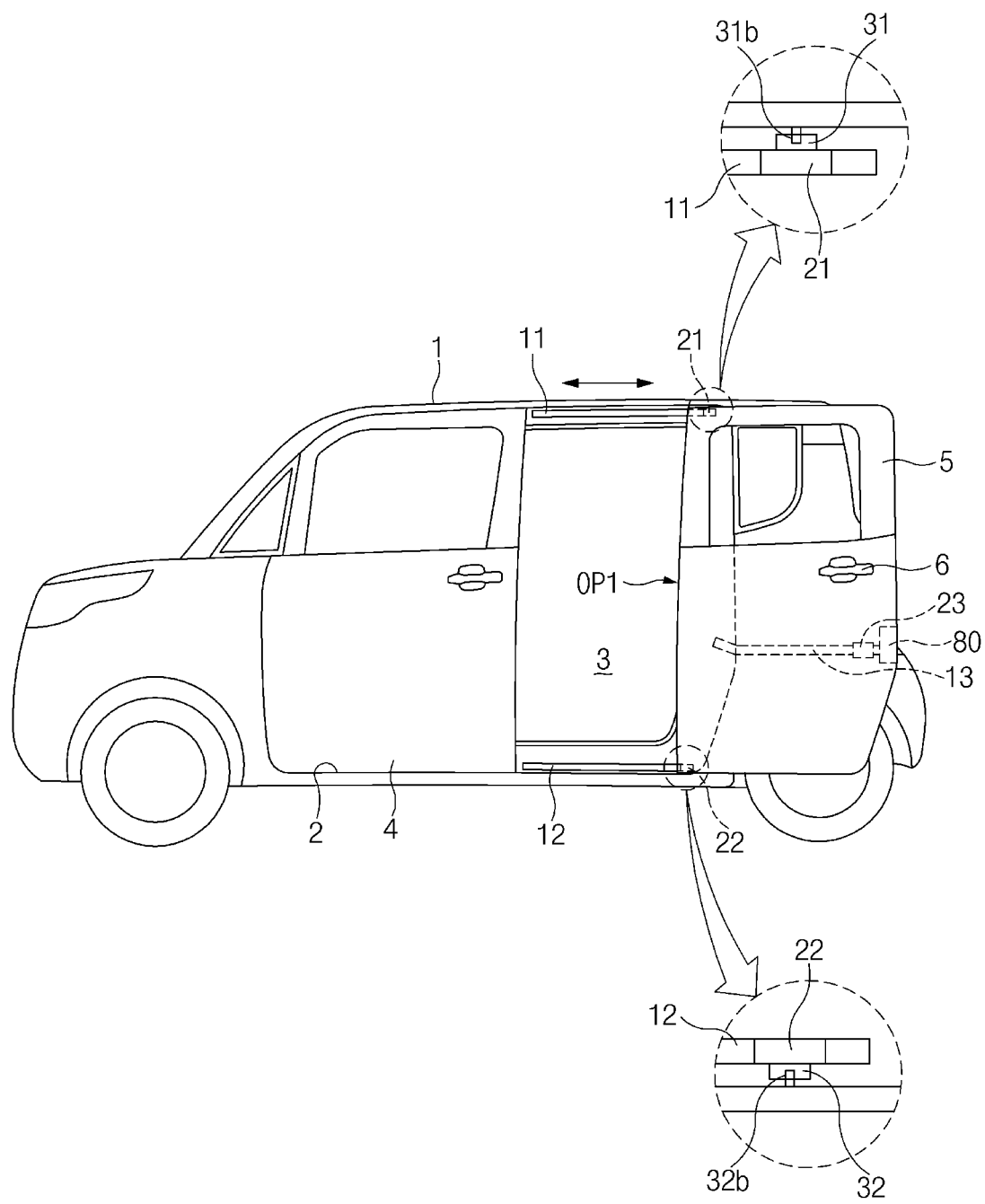
FIG. 3 illustrates a state in which the door of FIG. 1 is opened in sliding mode.

Referring to FIGS. 1 and 3, an upper roller unit 21 may be mounted on an upper end of the vehicle door 5, and the upper roller unit 21 may slide along the upper rail 11. A lower roller unit 22 may be mounted on a lower end of the vehicle door 5, and the lower roller unit 22 may slide along the lower rail 12.

Figure 2:
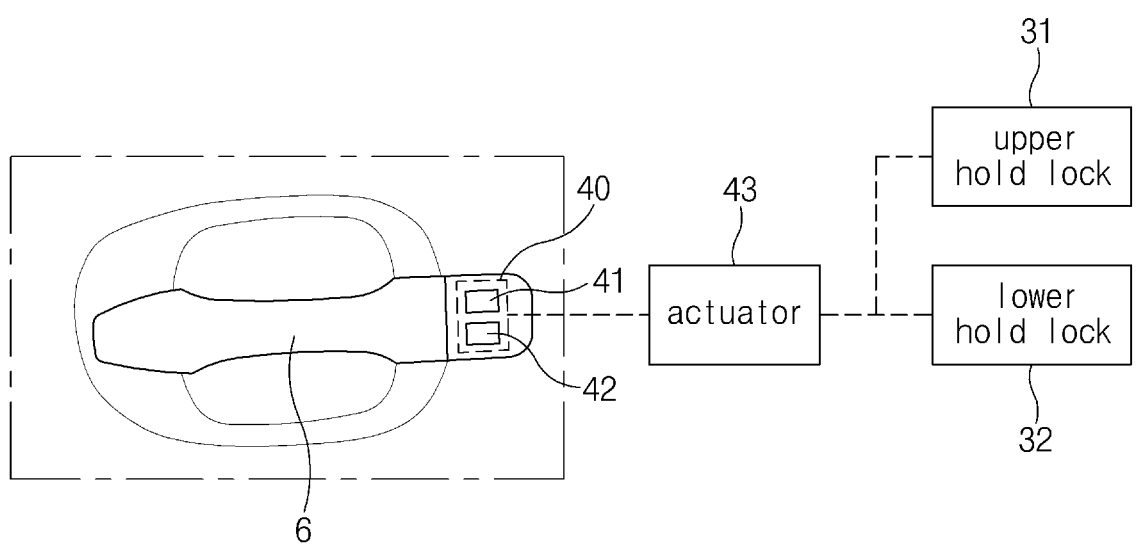
FIG. 2 illustrates a selector adjacent to an outside handle of a vehicle, an actuator connected to the selector, and hold locks.

Referring to FIG. 2, the vehicle door 5 may include an outside handle 6, and a selector 40 for selecting the sliding mode or the swing mode may be adjacent to the outside handle 6. The selector 40 may have a first switch 41 selecting the sliding mode, and a second switch 42 selecting the swing mode.

When a user presses the first switch 41 and the sliding mode is selected, the vehicle door 5 may slide along the upper rail 11, the lower rail 12, and a center rail 13 as illustrated in FIG. 3 as the user pushes the outside handle 6 toward the front of the vehicle or pulls the outside handle 6 toward the rear of the vehicle. In the sliding mode, the vehicle door 5 may move between a first open position OP1 in which the vehicle door 5 is fully opened and a first closed position CP1 in which the vehicle door 5 is fully closed, as illustrated in FIGS. 1 and 3.

Figure 4:
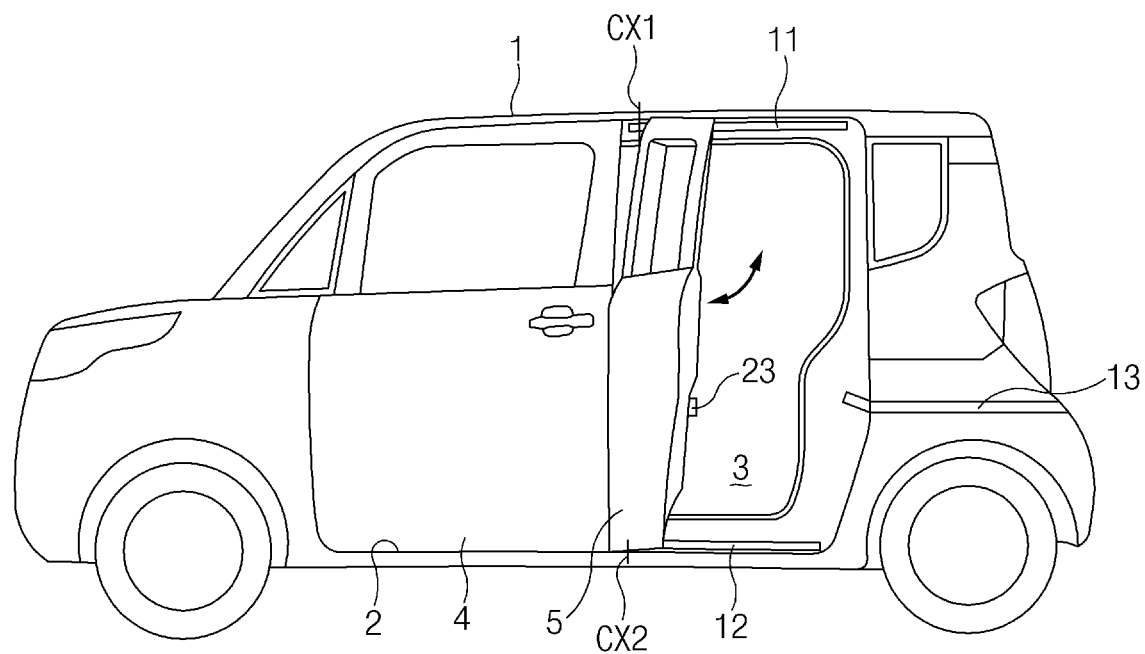
FIG. 4 illustrates a state in which the door of FIG. 1 is opened in swing mode.
Figure 7:
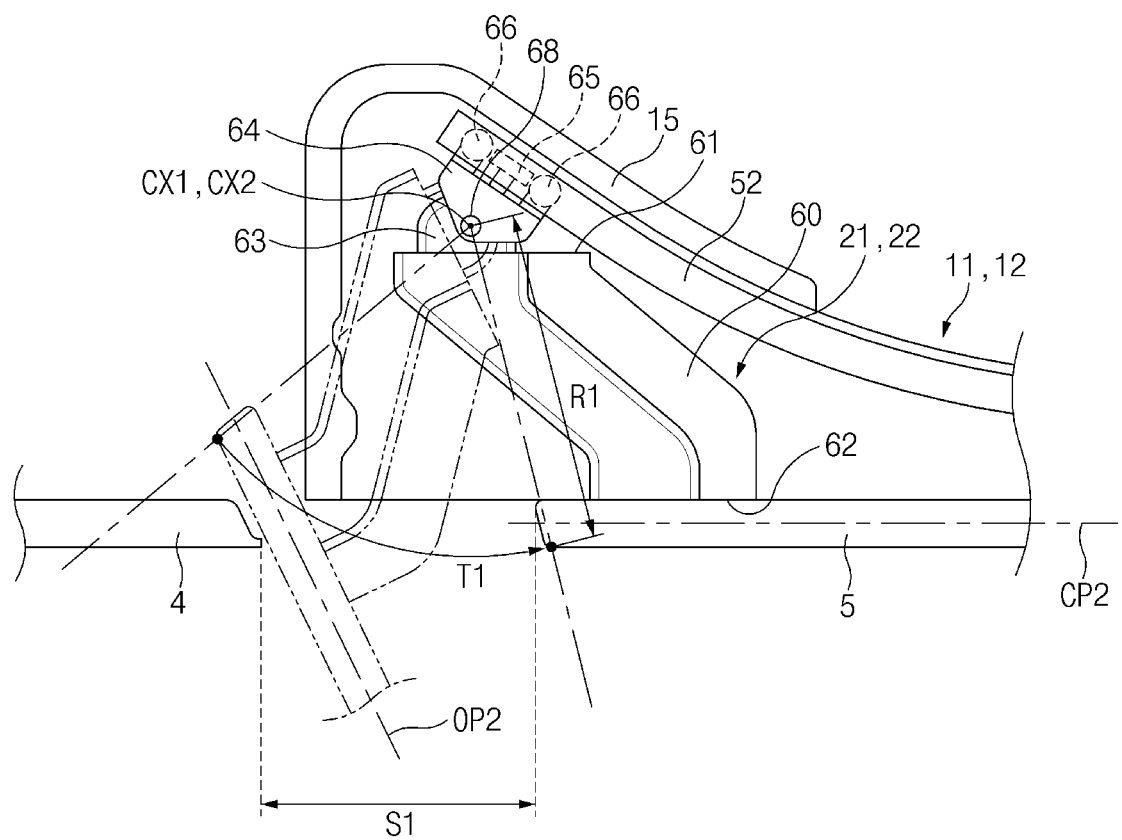
FIG. 7 illustrates an operation in which a vehicle door is opened and closed in swing mode by an upper roller unit and a lower roller unit of a vehicle door opening and closing apparatus according to an exemplary embodiment of the present disclosure.
Figure 9:
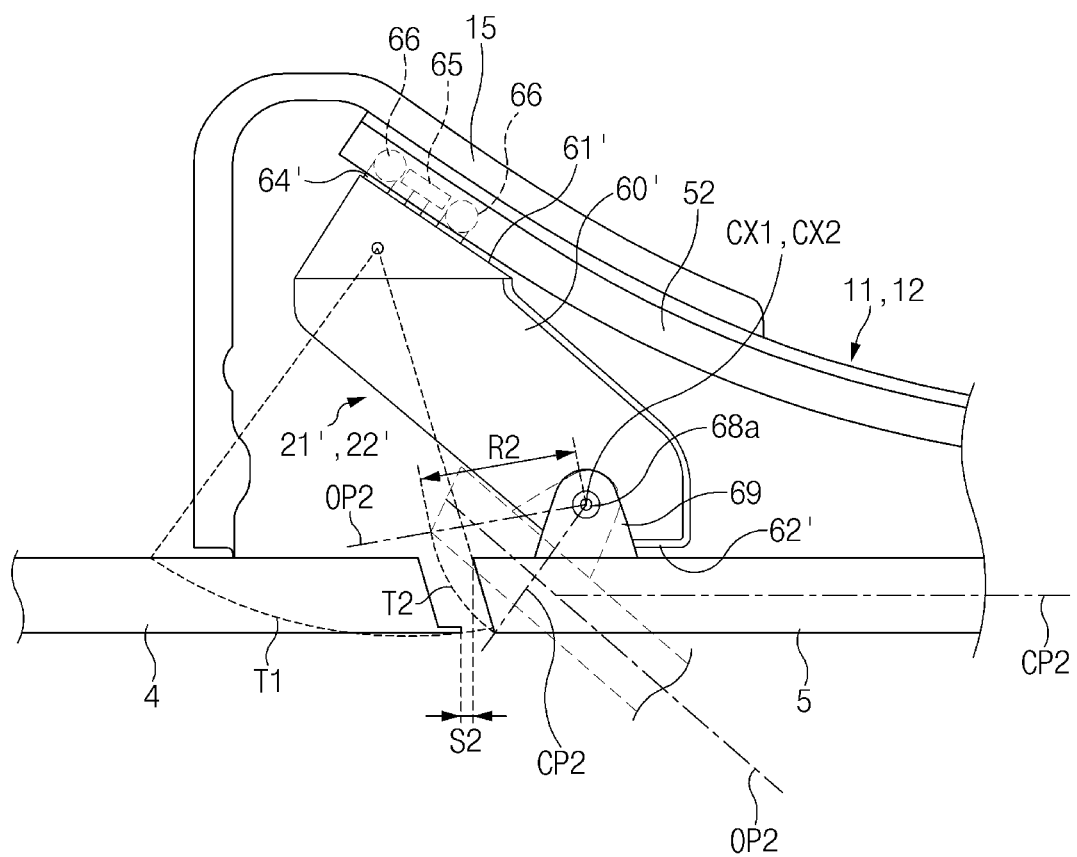
FIG. 9 illustrates an operation in which a vehicle door is opened and closed in swing mode by an upper roller unit and a lower roller unit of a vehicle door opening and closing apparatus according to another exemplary embodiment of the present disclosure.

When the user presses the second switch 42 and the swing mode is selected, the vehicle door 5 may swing as illustrated in FIG. 4 as the user pushes or pulls the outside handle 6 toward a passenger compartment of the vehicle or toward the exterior side of the vehicle. In the swing mode, the vehicle door 5 may move between a second open position OP2 in which the vehicle door 5 is fully opened and a second closed position CP2 in which the vehicle door 5 is fully closed, as illustrated in FIGS. 7 and 9. In particular, when the vehicle door 5 is held in the first closed position CP1, it may be operated in the swing mode.

The upper roller unit 21 may have an upper hold lock 31, and the vehicle body 1 may have a first upper striker 31a and a second upper striker 31b protruding downwardly from the top of the vehicle body 1. The first upper striker 31a may be aligned with or adjacent to a virtual axis of the first closed position CP1, and the second upper striker 31b may be aligned with or adjacent to a virtual axis of the first open position OP1.

According to an exemplary embodiment, as illustrated in FIGS. 1 and 3, the upper hold lock 31 may releasably hold the first upper striker 31a in the first closed position CP1, and releasably hold the second upper striker 31b in the first open position OP1. That is, one upper hold lock 31 may selectively hold the first upper striker 31a and the second upper striker 31b. As the upper hold lock 31 holds the first upper striker 31a, the upper roller unit 21 may be firmly held in the first closed position CP1, so that the vehicle door 5 may be kept in the first closed position CP1. As the upper hold lock 31 holds the second upper striker 31b, the upper roller unit 21 may be firmly held in the first open position OP1, so that the vehicle door 5 may be kept in the first open position OP1.

According to another exemplary embodiment, the upper hold lock 31 may releasably hold the first upper striker 31a in the first closed position CP1 so that the vehicle door 5 may be kept in the first closed position CP1. That is, the upper hold lock 31 may be an upper closed hold lock which keeps the closed state of the vehicle door 5 in the first closed position CP1. An upper open hold lock (not shown) may be mounted on the upper roller unit 21, and may releasably hold the second upper striker 31b in the first open position OP1. That is, the upper closed hold lock 31, which releasably holds the first upper striker 31a in the first closed 31b in the first open position OP1, may be individually mounted on the upper roller unit 21.

Referring to FIGS. 4 and 9, the upper roller unit 21 may have an upper rotation axis CX1, and the vehicle door 5 may rotate around the upper rotation axis CX1. When the upper roller unit 21 is firmly held in the first closed position CP1 by the upper hold lock 31 and the first upper striker 31a, the vehicle door 5 may rotate around the upper rotation axis CX1.

The lower roller unit 22 may have a lower hold lock 32, and the vehicle body 1 may have a first lower striker 32a and a second lower striker 32b protruding upwardly from the bottom of the vehicle body 1. The first lower striker 32a may be aligned with or adjacent to the virtual axis of the first closed position CP1, and the second lower striker 32b may be aligned with or adjacent to the virtual axis of the first open position OP1.

According to an exemplary embodiment, as illustrated in FIGS. 1 and 3, the lower hold lock 32 may releasably hold the first lower striker 32a in the first closed position CP1, and releasably hold the second lower striker 32b in the first open position OP1. That is, one lower hold lock 32 may selectively hold the first lower striker 32a and the second lower striker 32b. As the lower hold lock 32 holds the first lower striker 32a, the lower roller unit 22 may be firmly held in the first closed position CP1, so that the vehicle door 5 may be kept in the first closed position CP1. As the lower hold lock 32 holds the second lower striker 32b, the lower roller unit 22 may be firmly held in the first open position OP1, so that the vehicle door 5 may be kept in the first open position OP1.

According to another exemplary embodiment, the lower hold lock 32 may releasably hold the first lower striker 32a in the first closed position CP1 so that the vehicle door 5 may be kept in the first closed position CP1. That is, the lower hold lock 32 may be a lower closed hold lock which keeps the closed state of the vehicle door 5 in the first closed position CP1. A lower open hold lock (not shown) may be mounted on the lower roller unit 22, and may releasably hold the second lower striker 32b in the first open position OP1. That is, the lower closed hold lock 32, which releasably holds the first lower striker 32a in the first closed position CP1, and the lower open hold lock (not shown), which releasably holds the second lower striker 32b in the first open position OP1, may be individually mounted on the lower roller unit 22.

According to an exemplary embodiment, the vehicle door 5 may be releasably held in the first closed position CP1 by the upper hold lock 31 and the lower hold lock 32, so that the vehicle door 5 may be kept in the first closed position CP1 by the upper hold lock 31 and the lower hold lock 32. That is, the upper hold lock 31 and the lower hold lock 32 may function as the closed hold lock which keeps the vehicle door 5 in the first closed position CP1.

Referring to FIGS. 4 and 9, the lower roller unit 22 may have a lower rotation axis CX2, and the vehicle door 5 may rotate around the lower rotation axis CX2. When the lower roller unit 22 is firmly held in the first closed position CP1 by the lower hold lock 32 and the first lower striker 32a, the vehicle door 5 may rotate around the lower rotation axis CX2.

As illustrated in FIG. 4, the upper rotation axis CX1 and the lower rotation axis CX2 may be vertically aligned, and the vehicle door 5 may rotate around the vertically aligned upper and lower rotation axes CX1 and CX2.

Referring to FIG. 2, the selector 40 may be electrically connected to an actuator 43, and the actuator 43 may be configured to operate the upper hold lock 31 and the lower hold lock 32.

As the user selects the selector 40, the actuator 43 may selectively perform a hold operation in which the upper hold lock 31 holds the first upper striker 31 and the lower hold lock 32 holds the first lower striker 32a, and a release operation in which the upper hold lock 31 releases the first upper striker 31a and the lower hold lock 32 releases the first lower striker 32a.

When the user presses the first switch 41 of the selector 40 in a state in which the vehicle door 5 is closed, the upper hold lock 31 may release the first upper striker 31a and the lower hold lock 32 may release the first lower striker 32a simultaneously by the release operation of the actuator 43. Thus, the user may slide the vehicle door 5 in the longitudinal direction of the vehicle body 1 so that the vehicle door 5 may be opened and closed in the sliding mode.

When the user presses the second switch 42 of the selector 40 in a state in which the vehicle door 5 is closed, the upper hold lock 31 may hold the first upper striker 31a and the lower hold lock 32 may hold the first lower striker 32a simultaneously by the hold operation of the actuator 43, and the upper roller unit 21 and the lower roller unit 22 may be firmly held in the first closed position CP1. Thus, the user may swing the vehicle door 5 toward an interior space and an exterior space of the vehicle so that the vehicle door 5 may be opened and closed in the swing mode.

According to an exemplar)/embodiment, as illustrated in FIG. 2, one actuator 43 may operate the upper hold lock 31 and the lower hold lock 32 simultaneously.

According to another exemplary embodiment, an actuator operating the upper hold lock 31 and another actuator operating the lower hold lock 32 may be individually connected to the selector 40.

FIGS. 10A to 10D illustrate the upper hold lock 31 and the lower hold lock 32 according to an exemplar)/embodiment of the present disclosure. Referring to FIGS. 10A to 10D, each of the upper hold lock 31 and the lower hold lock 32 may include a catch 71, a pawl 72 releasably engaging with the catch 71, and a lever 73 operatively connected to the pawl 72. The lever 73 may be connected to the actuator 43 through a cable 75. As the cable 75 is reversed (pulled) by the actuator 43, the catch 71 may release the strikers 31a and 32a. A portion of the catch 71, the pawl 72, and the lever 73 may be covered by a cover plate 76, and the cover plate 76 may be attached to a mounting plate 74. The strikers 31a and 32a may be fixed to the vehicle body 1 by a mounting plate 78.

Referring to FIGS. 10A to 10D, the upper hold lock 31 may releasably hold the first upper striker 31a, and the lower hold lock 32 may releasably hold the first lower striker 32a.

Figure 10A:
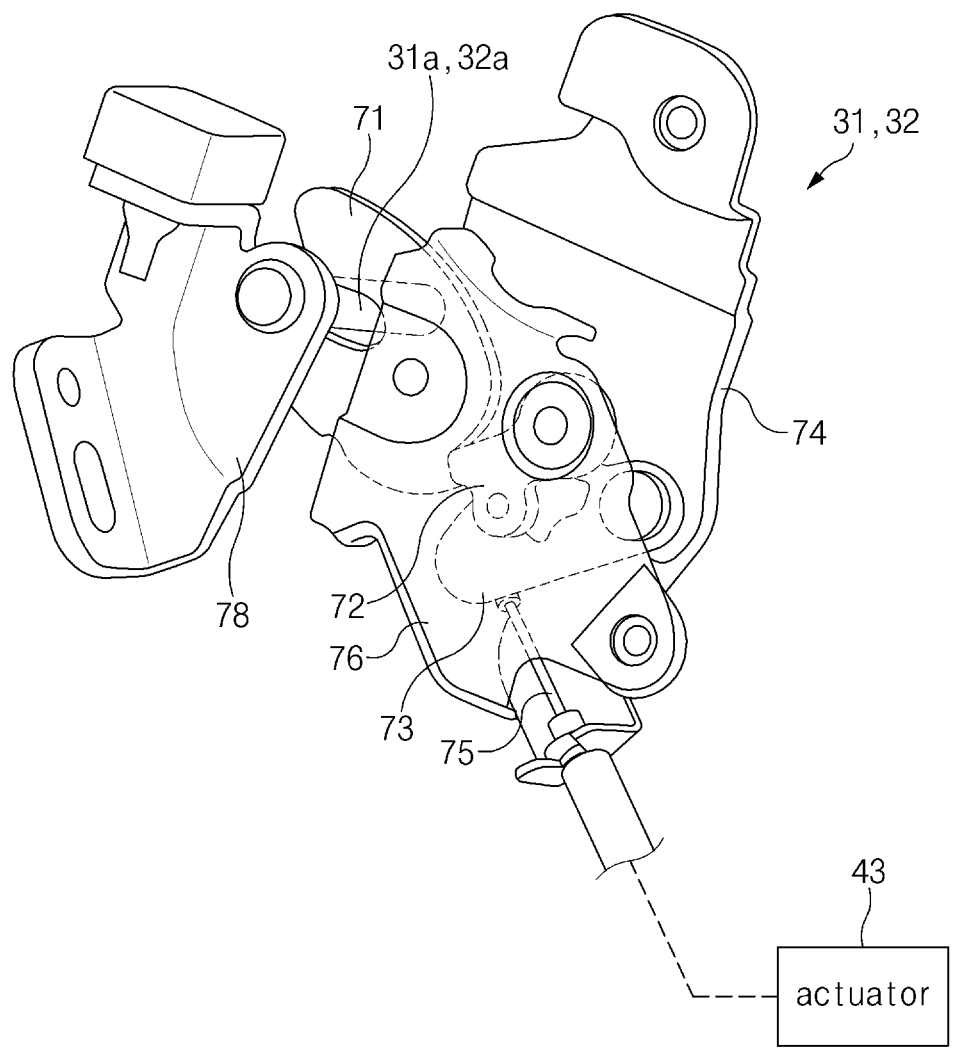
FIG. 10A illustrates a perspective view of an upper hold lock and a lower hold lock.
Figure 10B:
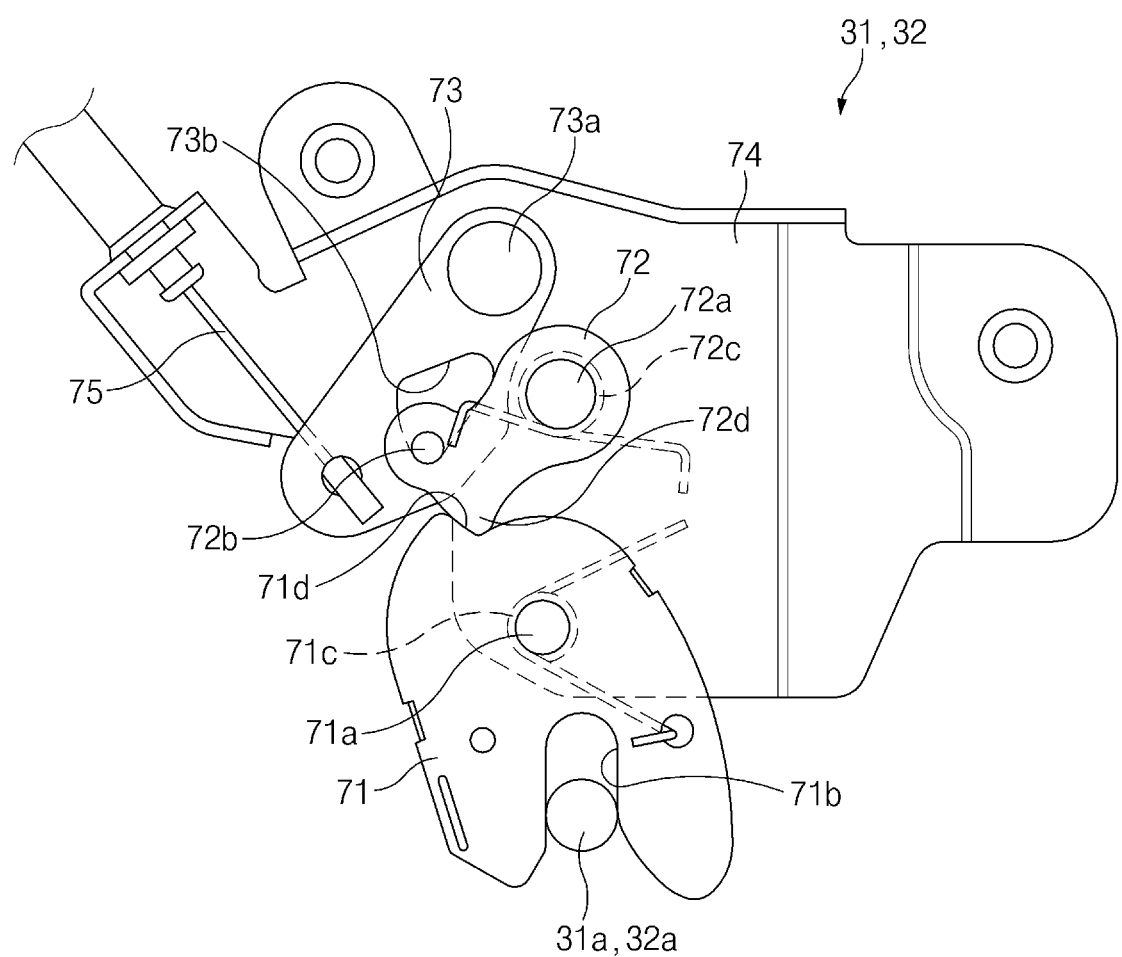
FIG. 10B illustrates a state in which an upper hold lock and a lower hold lock hold corresponding strikers.
Figure 10C:
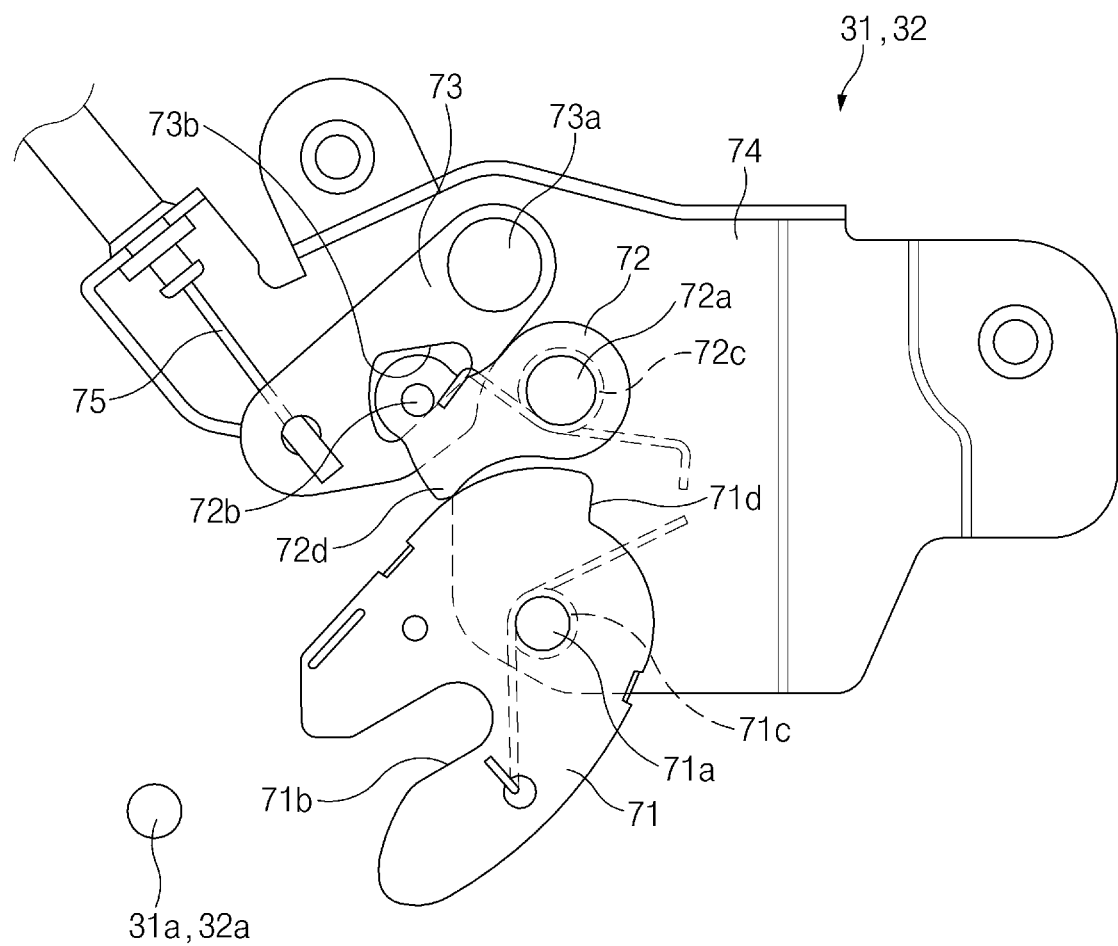
FIG. 10C illustrates a state in which an upper hold lock and a lower hold lock release corresponding strikers.

The catch 71 may be pivotally mounted on the mounting plate 74 through a first pivot shaft 71a. The catch 71 may have a slot 71b receiving the strikers 31a and 32a, and the catch 71 may engage and release the strikers 31a and 32a. The catch 71 may move between an engaging position (see FIG. 10B) and a release position (see FIG. 10C). The engaging position refers to a position in which the catch 71 engages with the strikers 31a and 32a as illustrated in FIG. 10B, and the release position refers to a position in which the catch 71 releases the strikers 31a and 32a as illustrated in FIG. 10C. When the catch 71 is in the engaging position as illustrated in FIG. 10B, the catch 71 may engage with the strikers 31a and 32a so that the catch 71 may hold the strikers 31a and 32a. When the catch 71 is in the release position as illustrated in FIG. 10C, the catch 71 may release the strikers 31a and 32a. Thus, the strikers 31a and 32a may be released from the slot 71b of the catch 71 or be received in the slot 71b of the catch 71. The catch 71 may be biased toward the release position by a first biasing element 71c such as a torsion spring. The first biasing element 71c may be disposed around the first pivot shaft 71a The catch 71 may have a locking shoulder 71d.

Figure 10D:
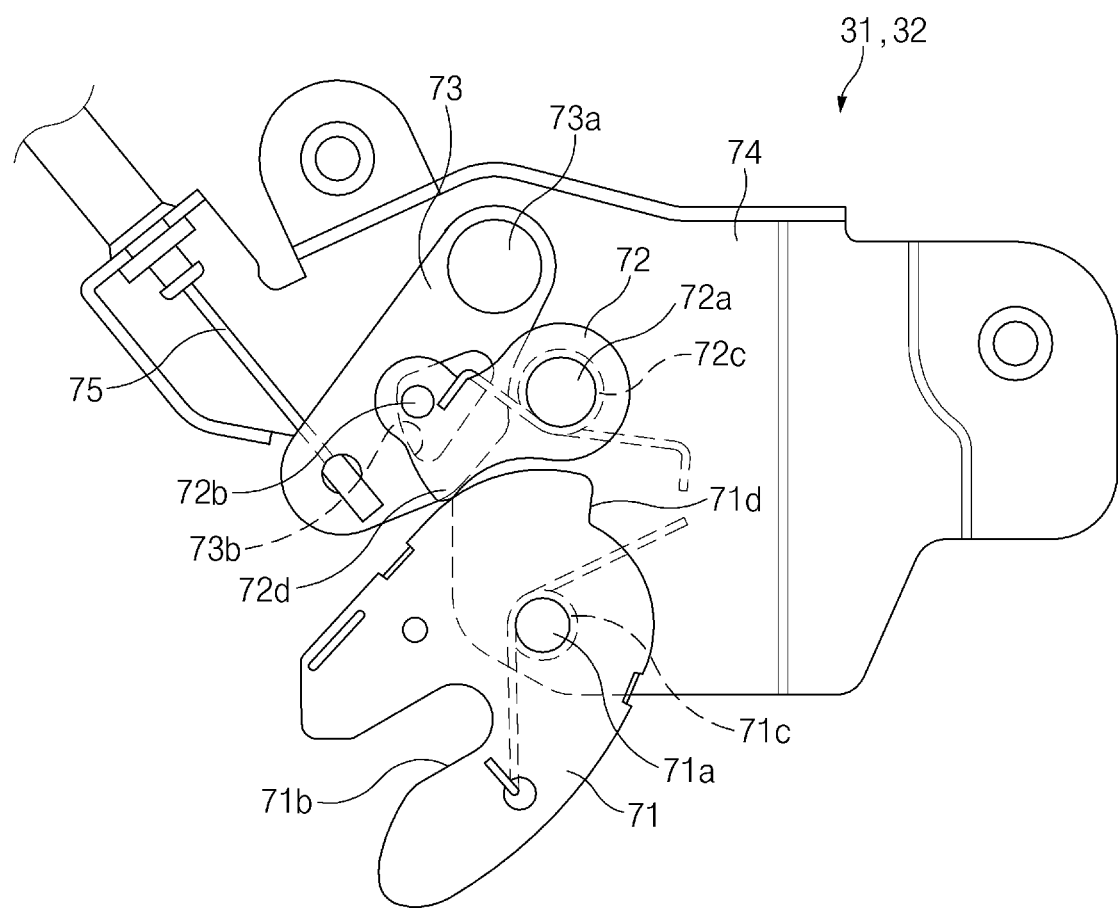
FIG. 10D illustrates a state in which an upper hold lock and a lower hold lock are enabled to receive corresponding strikers.

The pawl 72 may be pivotally mounted on the mounting plate 74 through a second pivot shaft 72a, and the pawl 72 may move between a pawl locking position (see FIG. 10B) and a pawl release position (see FIGS. 10C and 10D). The pawl locking position refers to a position in which the pawl 72 engages with the catch 71 and the catch 71 is kept in the engaging position, and the pawl release position refers to a position in which the pawl 72 releases the catch 71 and the catch 71 is allowed to move from the engaging position to the release position. As illustrated in FIG. 10B, when the pawl 72 is in the pawl locking position, the movement (rotation) of the catch 71 may be restricted by the pawl 72 so that the catch 71 may be kept in the engaging position. As illustrated in FIGS. 10C and 10D, when the pawl 72 is in the pawl release position, the movement (rotation) of the catch 71 may not be restricted by the pawl 72 so that the catch 71 may move from the engaging position to the release position. The pawl 72 may be biased toward the pawl locking position (see FIG. 10B) by a second biasing element 72c such as a torsion spring. The second biasing element 72c may be disposed around the second pivot shaft 72a.

The pawl 72 may have a locking projection 72d locked to the locking shoulder 71d of the catch 71. As illustrated in FIG. 10B, as the pawl 72 is moved to the pawl locking position by the second biasing element 72c, the locking projection 72d of the pawl 72 may be locked to the locking shoulder 71d of the catch 71 and the movement (rotation) of the catch 71 may be restricted, so that the catch 71 may be kept in the engaging position. As illustrated in FIG. 10C, as the pawl 72 is moved to the pawl release position by the lever 73, the locking projection 72d of the pawl 72 may be released from the locking shoulder 71d of the catch 71 and the movement (rotation) of the catch 71 may be allowed, so that the catch 71 may be moved to the release position by the first biasing element 71c.

The lever 73 may be pivotally mounted on the mounting plate 74 through a third pivot shaft 73a. The lever 73 may be connected to the actuator 43 through the cable 75. An end of the cable 75 may be fixed to the lever 73, and the cable 75 may be advanced or reversed by the actuator 43. As the actuator 43 moves the cable 75, the lever 73 may pivot around the third pivot shaft 73a The lever 73 may move the pawl 72 to the pawl release position (see FIG. 10C) by reversing the cable 75.

The lever 73 may be operatively connected to the pawl 72 through a pin 72b and an opening 73b. The pin 72b may be provided on the pawl 72, and the opening 73b may be provided in the lever 73. The pin 72b may be movably received in the opening 73b. As the lever 73 pivots around the third pivot shaft 73a, the pin 72b may move in the opening 73b, allowing the pawl 72 to move.

As illustrated in FIG. 10B, when the cable 75 is advanced by the actuator 43, the locking projection 72d of the pawl 72 may be locked to the locking shoulder 71d of the catch 71 and the movement (rotation) of the catch 71 may be restricted so that the catch 71 may be kept in the engaging position. The strikers 31a and 32a may be held in the slot 71b of the catch 71. That is, the upper hold lock 31 and the lower hold lock 32 may hold the corresponding strikers 31a and 32a As illustrated in FIG. 10C, when the cable 75 is reversed by the actuator 43, the lever 73 may move the pawl 72 to the pawl release position. The locking projection 72d of the pawl 72 may be released from the locking shoulder 71d of the catch 71 and the movement (rotation) of the catch 71 may be allowed, so that the catch 71 may be moved to the release position by the first biasing element 71c, and the strikers 31a and 32a may be released from the slot 71b of the catch 71. Thus, the upper hold lock 31 and the lower hold lock 32 may release the corresponding strikers 31a and 32a, and the upper roller unit 21 and the lower roller unit 22 may slide along the upper rail 11 and the lower rail 12.

As illustrated in FIG. 10D, even though the cable 75 is advanced by the actuator 43 in a state in which the locking projection 72d of the pawl 72 is released from the locking shoulder 71d of the catch 71, the catch 71 may be kept in the release position by the first biasing element 71c so that the movement (rotation) of the catch 71 may be allowed. In this state, the strikers 31a and 32a may be allowed to be received in the slot 71b of the catch 71. That is, in a state in which the movement (rotation) of the catch 71 is allowed as the locking projection 72d of the pawl 72 is released from the locking shoulder 71d of the catch 71, when the upper roller unit 21 and the lower roller unit 22 slide between the first closed position CP1 and the first open position OP1, the strikers 31a and 32a may be allowed to be received in the slot 71b of the catch 71. When a force applied by the upper hold lock 31 and the lower hold lock 32 in a state in which the strikers 31a and 32a are received in the slot 71b of the catch 71 is greater than a spring force of the first biasing element 71c, the catch 71 may be moved to the engaging position. As illustrated in FIG. 10B, as the locking projection 72d of the pawl 72 is locked to the locking shoulder 71d of the catch 71, the catch 71 may hold the strikers 31a and 32a.

Figure 5:
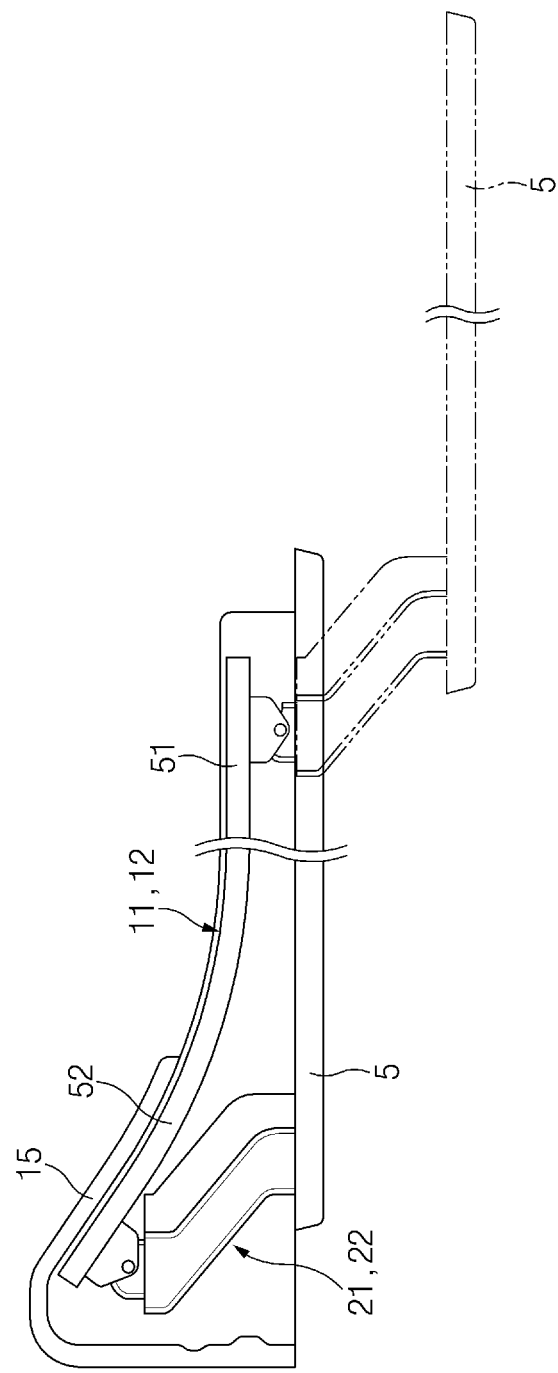
FIG. 5 illustrates an operation in which an upper roller unit and a lower roller unit move along an upper rail and a lower rail in a vehicle door opening and closing apparatus according to an exemplary embodiment of the present disclosure.

Referring to FIG. 5, each of the upper rail 11 and the lower rail 12 may be mounted on the vehicle body 1 through a mounting bracket 15, and the mounting bracket 15 may have a shape corresponding to that of the upper rail 11 and the lower rail 12. Each of the upper rail 11 and the lower rail 12 may have a first extension portion 51 extending in the longitudinal direction of the vehicle, and a second extension portion 52 extending from the first extension portion 51 toward the interior space of the vehicle. The second extension portion 52 may be bent with respect to the first extension portion 51 at a predetermined angle.

Figure 6:
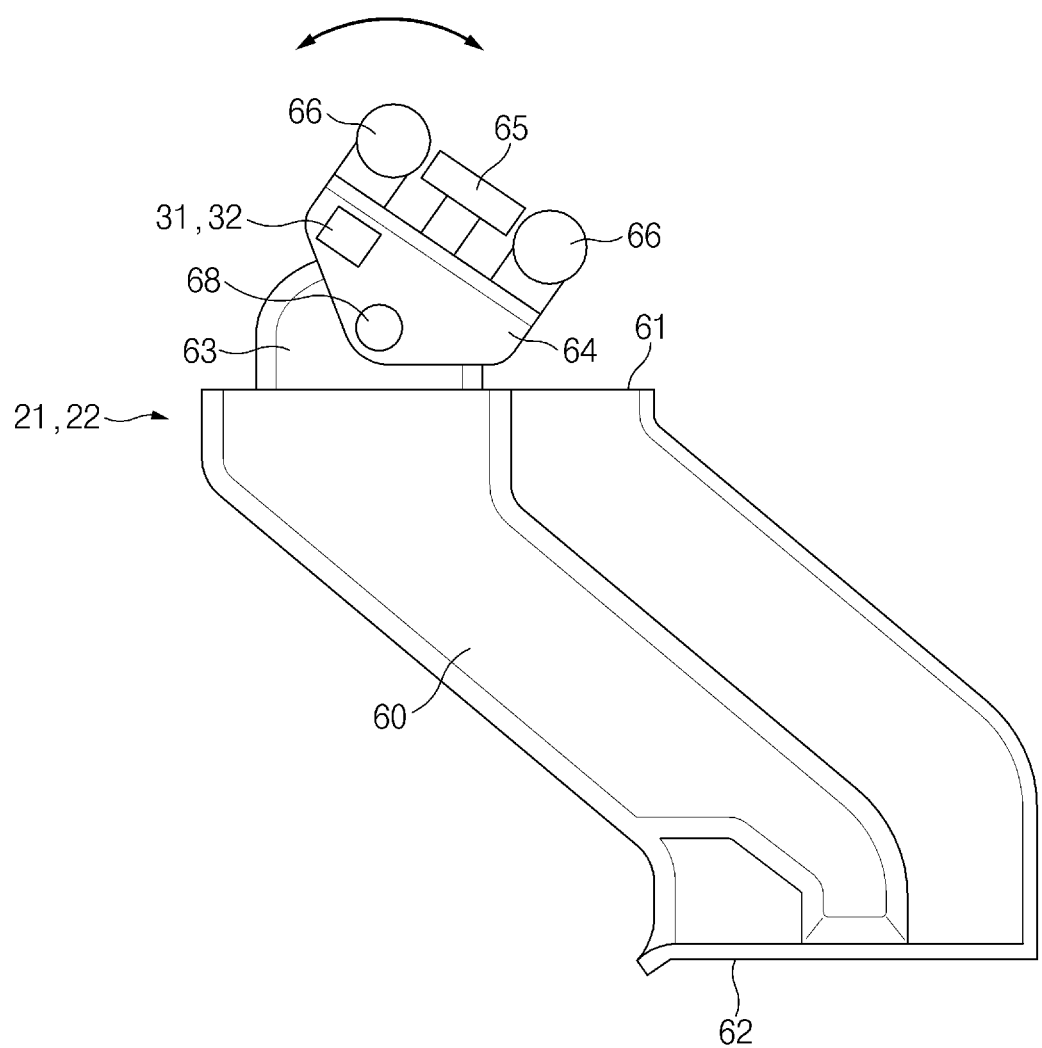
FIG. 6 illustrates an upper roller unit and a lower roller unit in a vehicle door opening and closing apparatus according to an exemplary embodiment of the present disclosure.

Referring to FIG. 6, each of the upper roller unit 21 and the lower roller unit 22 may include a roller bracket 64 having rollers 65 and 66 configured to roll along the rails 11 and 12, and a body 60 connecting the roller bracket 64 and the vehicle door 5.

The body 60 may extend diagonally so as not to contact the first extension portion 51 and the second extension portion 52. The body 60 may have a first end portion 61 facing the interior side of the vehicle, and a second end portion 62 facing the exterior side of the vehicle. The first end portion 61 of the body 60 may be attached to the roller bracket 64, and the second end portion 62 of the body 60 may be attached to the vehicle door 5.

The roller bracket 64 may rotatably support the rollers 65 and 66, and the rollers 65 and 66 may roll along the upper rail 11 and the lower rail 12. As illustrated in FIG. 6, a middle roller 65 and two side rollers 66 disposed on both sides of the middle roller 65 may be rotatably mounted on the roller bracket 64. A rotation axis of the middle roller 65 may be orthogonal to a rotation axis of the side roller 66.

According to an exemplary embodiment, as illustrated in FIG. 6, the first end portion 61 of the body 60 may be pivotally connected to the roller bracket 64 through a pivot pin 68, and the second end portion 62 of the body 60 may be fixed to the vehicle door 5. Thus, the vehicle door 5 may swing around the pivot pin 68 adjacent to the roller bracket 64. The body 60 may have a pivot lug 63 protruding from the first end portion 61 toward the roller bracket 64, and the roller bracket 64 may be connected to the pivot lug 63 through the pivot pin 68. The roller bracket 64 may be shaped so as not to interfere with the body 60 when the vehicle door 5 swings. The upper rotation axis CX1 and the lower rotation axis CX2 may be defined by the pivot pin 68. For example, the upper rotation axis CX1 and the lower rotation axis CX2 may be a virtual axis extending vertically along a center point of the pivot pin 68, and the upper rotation axis CX1 and the lower rotation axis CX2 may be vertically aligned, so that the vehicle door 5 may swing around the vertical rotation axis that virtually connects the upper rotation axis CX1 and the lower rotation axis CX2. The upper hold lock 31 may be fixed to the roller bracket 64 of the upper roller unit 21, and the lower hold lock 32 may be fixed to the roller bracket 64 of the lower roller unit 22.

When, by the hold operation of the actuator 43, the upper hold lock 31 firmly holds the roller bracket 64 of the upper roller unit 21 in the first closed position CP1 and the lower hold lock 32 firmly holds the roller bracket 64 of the lower roller unit 22 in the first closed position CP1, the vehicle door 5 may swing around the upper rotation axis CX1 of the upper roller unit 21 and the lower rotation axis CX2 of the lower roller unit 22 as illustrated in FIG. 7. The vehicle door 5 may move between the second closed position CP2 in which the vehicle door 5 is closed and the second open position OP2 in which the vehicle door 5 is opened. When the vehicle door 5 swings, another adjacent door 4 or other components may be spaced apart from the vehicle door 5 by a predetermined gap S1 so as not to interfere with the door 4 or the other components. For example, the vehicle door 5 may be a rear door, and another adjacent door 4 may be a front door.

According to the exemplary embodiment illustrated in FIGS. 6 and 7, as the pivot pin 68 is positioned between the roller bracket 64 and the first end portion 61 of the body 60, the rotation axes CX1 and CX2 of the vehicle door 5 may be relatively far from the vehicle door 5. A swing trajectory T1 and a rotation radius R1 of the vehicle door 5 may be increased so that the gap S1 between the vehicle door 5 and the adjacent door 4 may be increased. If the gap S1 between the vehicle door 5 and the adjacent door 4 is reduced, the vehicle door 5 may interfere with the adjacent door 4 when the vehicle door 5 moves toward the second open position OP2. In addition, the swing trajectory T1 of the vehicle door 5 may be reduced, and thus an open space created by the swing of the vehicle door 5 may be narrowed.

Figure 8:
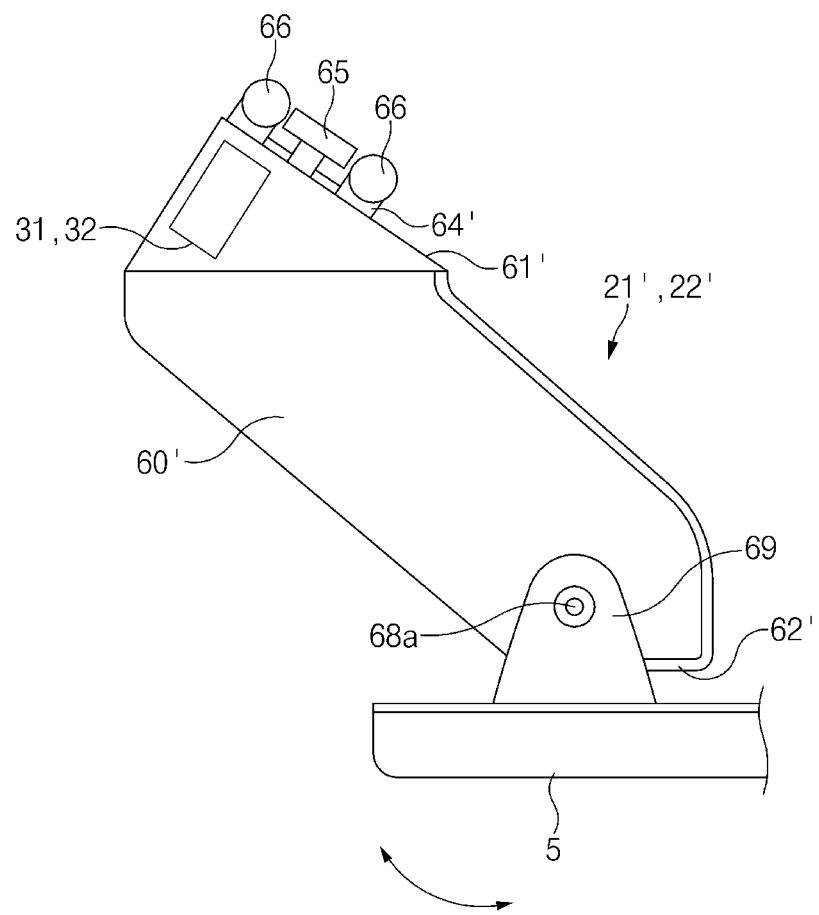
FIG. 8 illustrates an upper roller unit and a lower roller unit in a vehicle door opening and closing apparatus according to another exemplary embodiment of the present disclosure.

According to another exemplary embodiment, as illustrated in FIGS. 8 and 9, the first end portion 61' of the body 60 may be fixed to the roller bracket 64', and the second end portion 62' of the body 6Q may be pivotally connected to the vehicle door 5 through a pivot pin 68a. Thus, the vehicle door 5 may swing around the pivot pin 68a adjacent to the second end portion 62' of the body 604.

Referring to FIGS. 8 and 9, the roller bracket 64' may be fixed to the first end portion 61' of the body 60' by welding, using fasteners, and/or the like, and the second end portion 62' of the body 60 may be pivotally connected to the vehicle door 5 through the pivot pin 68a. The vehicle door 5 may have a pivot lug 69 protruding toward the body 60', and the pivot lug 69 may be pivotally connected to the second end portion 62', of the body 60' through the pivot pin 68a. The second end portion 62' of the body 60' may be shaped so as not to interfere with the vehicle door 5 when the vehicle door 5 swings. The upper rotation axis CX1 and the lower rotation axis CX2 may be defined by the pivot pin 68a. For example, the upper rotation axis CX1 and the lower rotation axis CX2 may be a virtual axis extending vertically along a center point of the pivot pin 68a, and the upper rotation axis CX1 and the lower rotation axis CX2 may be vertically aligned, so that the vehicle door 5 may swing around the vertical rotation axis that virtually connects the upper rotation axis CX1 and the lower rotation axis CX2. The upper hold lock 31 may be fixed to the body 60' of the upper roller unit 21', and the lower hold lock 32 may be fixed to the body 60' of the lower roller unit 22'.

Referring to FIG. 9, when the upper hold lock 31 fixedly holds the roller bracket 64 of the upper roller unit 21' in the first closed position CP1, and the lower hold lock 32 fixedly holds the roller bracket 64' of the lower roller unit 22' in the first closed position CP1, the vehicle door 5 may swing around the upper rotation axis CX1 of the upper roller unit 21' and the lower rotation axis CX2 of the lower roller unit 22'. Thus, the vehicle door 5 may move between the second closed position CP2 in which the vehicle door 5 is closed and the second open position OP2 in which the vehicle door 5 is opened.

According to the exemplary embodiment illustrated in FIGS. 8 and 9, as the pivot pin 68a is positioned between the second end portion 62' of the body 60' and the vehicle door 5, the rotation axes CX1 and CX2 of the vehicle door 5 may be relatively close to the vehicle door 5. A rotation radius R2 of the vehicle door 5 may be shortened, so that a gap S2 between the vehicle door 5 and another adjacent door 4 may be reduced, resulting in improved exterior styling. Even though the rotation axes CX1 and CX2 of the vehicle door 5 are close to the vehicle door 5, a swing trajectory T2 of the vehicle door 5 is not reduced, and thus an open space created by the swing of the vehicle door 5 may not be narrowed.

Figure 11:
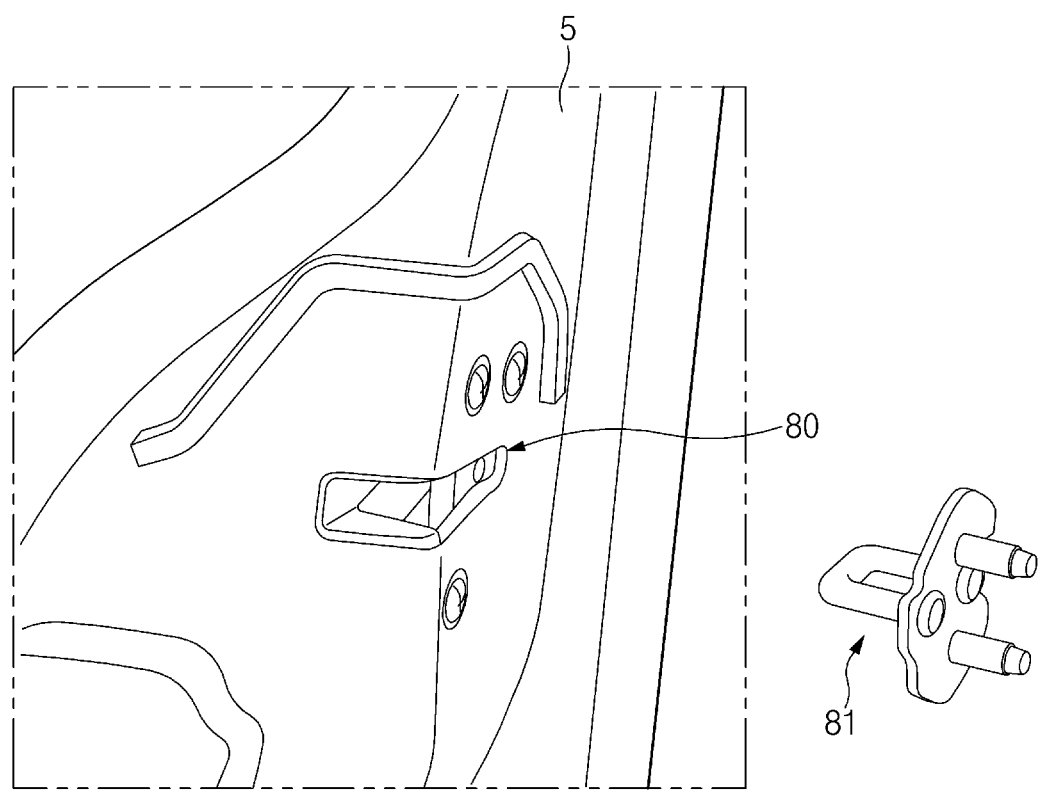
FIG. 11 illustrates a main latch mounted on a vehicle door and a main striker.

Referring to FIG. 11, a main latch 80 may be mounted on a rear end of the vehicle door 5, and a main striker 81 may be fixed to the vehicle body 1. The main latch 80 may releasably engage with the main striker 81. When the vehicle door 5 is in the first closed position CP1 or the second closed position CP2, the main latch 80 may engage with the main striker 81 by the engaging operation of the outside handle 6 so that the vehicle door 5 may be locked in the first closed position CP1 or the second closed position CP2. When the vehicle door 5 is in the first closed position CP1 or the second closed position CP2, the main latch 80 may release the main striker 81 by the release operation of the outside handle 6 so that the vehicle door 5 may be allowed to move in the sliding mode or the swing mode. When the vehicle door 5 is held in the first closed position CP1 and the main latch 80 releases the main striker 81, a center roller unit 23 may be released from the center rail 13, and thus the vehicle door 5 may be opened and closed in the swing mode.

The vehicle door opening and closing apparatus, according to an exemplary embodiment of the present disclosure, may further include the center rail 13 mounted at a central portion of the vehicle body 1 and the center roller unit 23 guided along the center rail 13.

Referring to FIGS. 1 and 3, the center rail 13 may extend from an edge of the door aperture 3 in the longitudinal direction of the vehicle. The center roller unit 23 may be pivotally mounted at a central portion of the vehicle door 5. In particular, the center roller unit 23 may be mounted in a position adjacent to the rear end of the vehicle door 5. The center roller unit 23 may be guided along the center rail 13.

Figure 12:
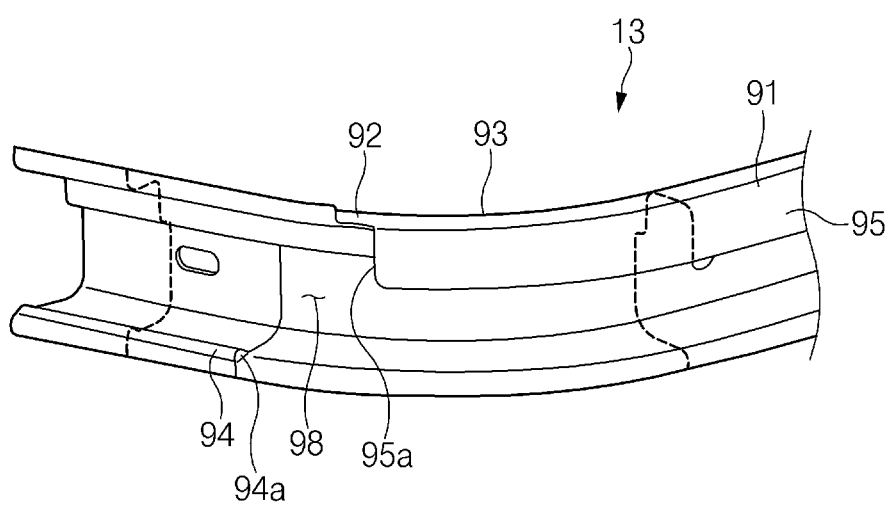
FIG. 12 illustrates a perspective view of a center rail in a vehicle door opening and closing apparatus according to an exemplary embodiment of the present disclosure.

Referring to FIG. 12, the center rail 13 may include a sliding guide 91 extending in the longitudinal direction of the vehicle, and a swing guide 92 extending from the sliding guide 91 toward the interior side of the vehicle. The swing guide 92 may be bent at a predetermined angle with respect to the sliding guide 91 through a bending portion 93, and the bending portion 93 may be curved at a predetermined radius.

Figure 13:
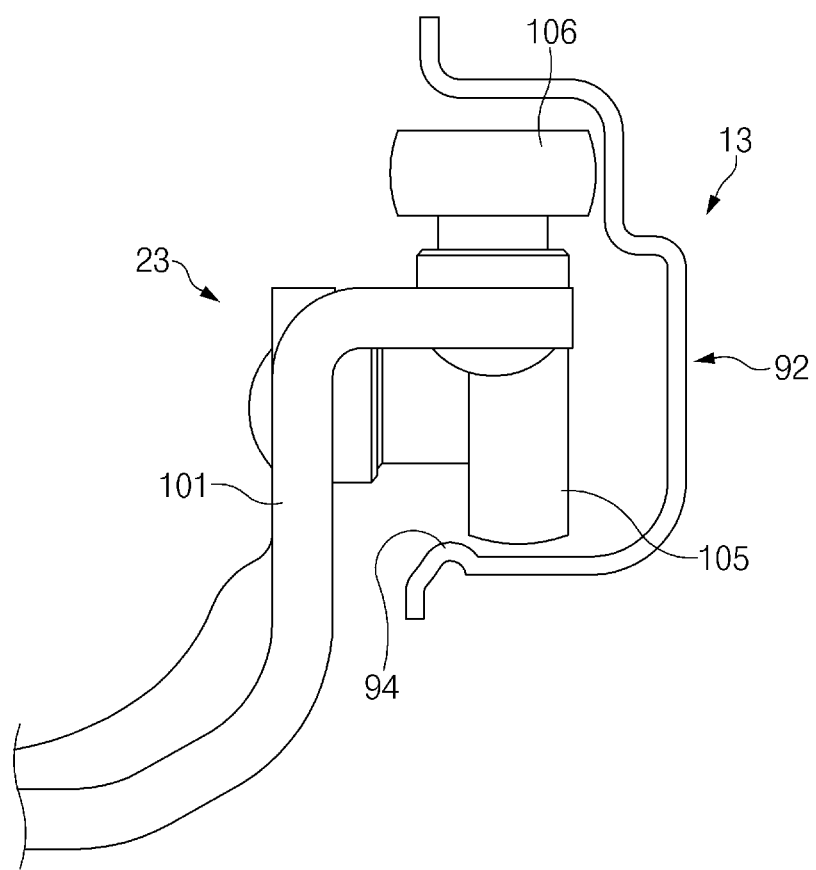
FIG. 13 illustrates a cross-sectional view of a swing guide of a center rail.
Figure 14:
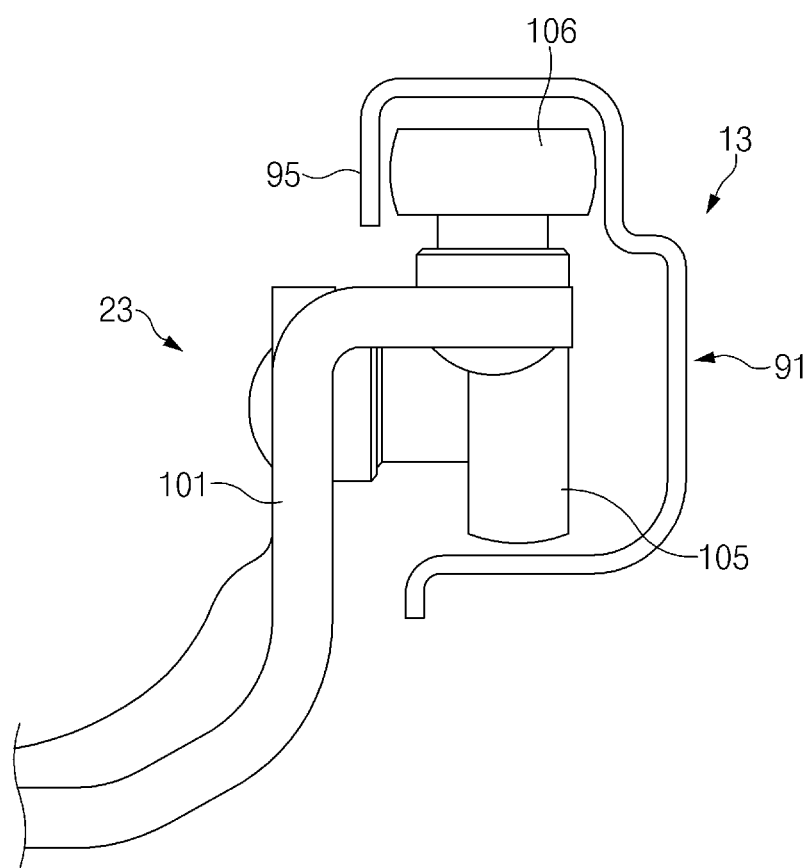
FIG. 14 illustrates a cross-sectional view of a sliding guide of a center rail.
Figure 15:
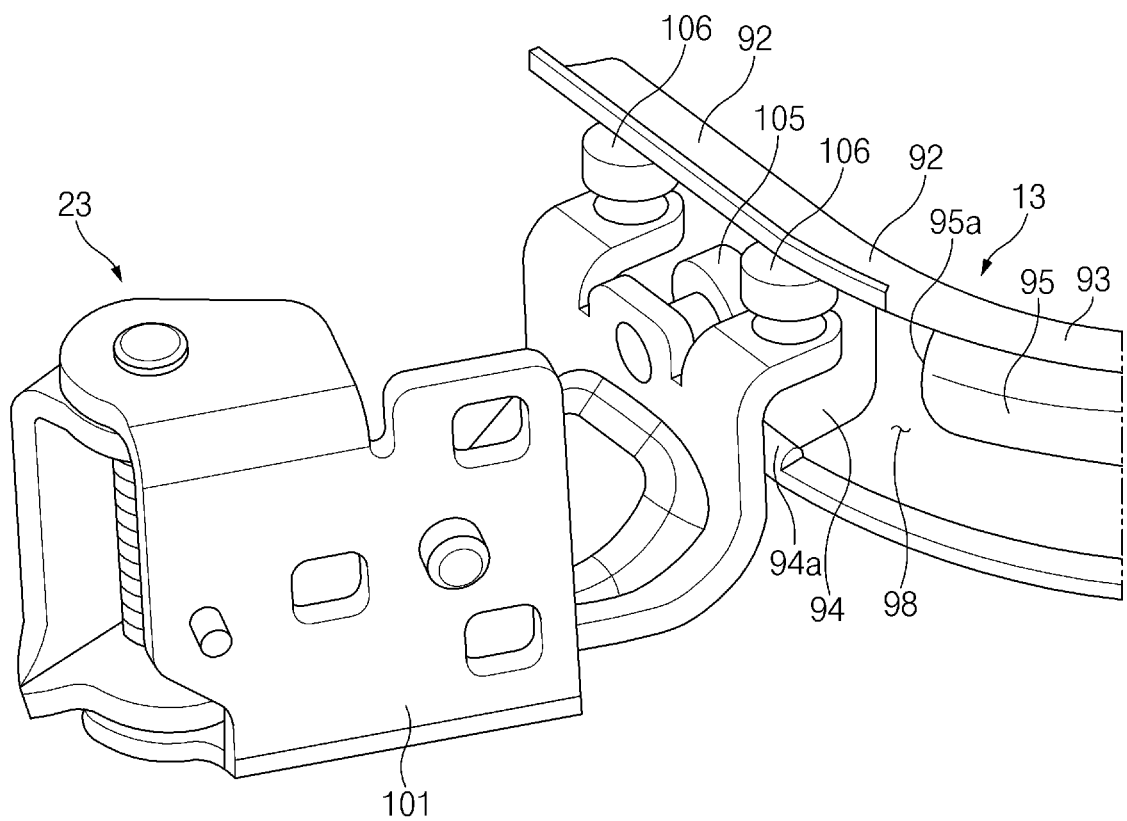
FIG. 15 illustrates a structure in which a center roller unit is held in a swing guide of a center rail.

Referring to FIGS. 13 to 15, the center roller unit 23 may include a roller bracket 101 and rollers 105 and 106 rotatably mounted on the roller bracket 101. The roller bracket 101 may be pivotally mounted at the central portion of the vehicle door 5. The rollers 105 and 106 may roll along the center rail 13. As illustrated in FIG. 15, a middle roller 105 and two side rollers 106 disposed on both sides of the middle roller 105 may be rotatably mounted on the roller bracket 101. A rotation axis of the middle roller 105 may be orthogonal to a rotation axis of the side roller 106.

When the vehicle door 5 slides in the longitudinal direction of the vehicle as the sliding mode is selected, the sliding guide 91 may guide the center roller unit 23.

Referring to FIGS. 12 and 14, the sliding guide 91 may include a stopper wall 95 configured to prevent the rollers 105 and 106 of the center roller unit 23 from being separated from the sliding guide 91. The stopper wall 95 may extend along a length of the sliding guide 91 and a length of the bending portion 93. The stopper wall 95 may protrude vertically downward from the top of the sliding guide 91. As the stopper wall 95 closes an upper area of the sliding guide 91 and an upper area of the bending portion 93, the center roller unit 23 may be prevented from moving away from the sliding guide 91 toward the exterior side of the vehicle as illustrated in FIG. 14.

When the vehicle door 5 is opened and closed in the swing mode as the swing mode is selected, the swing guide 92 may guide the rollers 105 and 106 of the center roller unit 23 to be released from the center rail 13.

An exterior side of the swing guide 92 may be entirely opened toward the exterior space of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along the swing trajectory T1 or T2, the middle roller 105 of the center roller unit 23 may be guided along the guide projection 94 as illustrated in FIG. 13.

Figure 16:
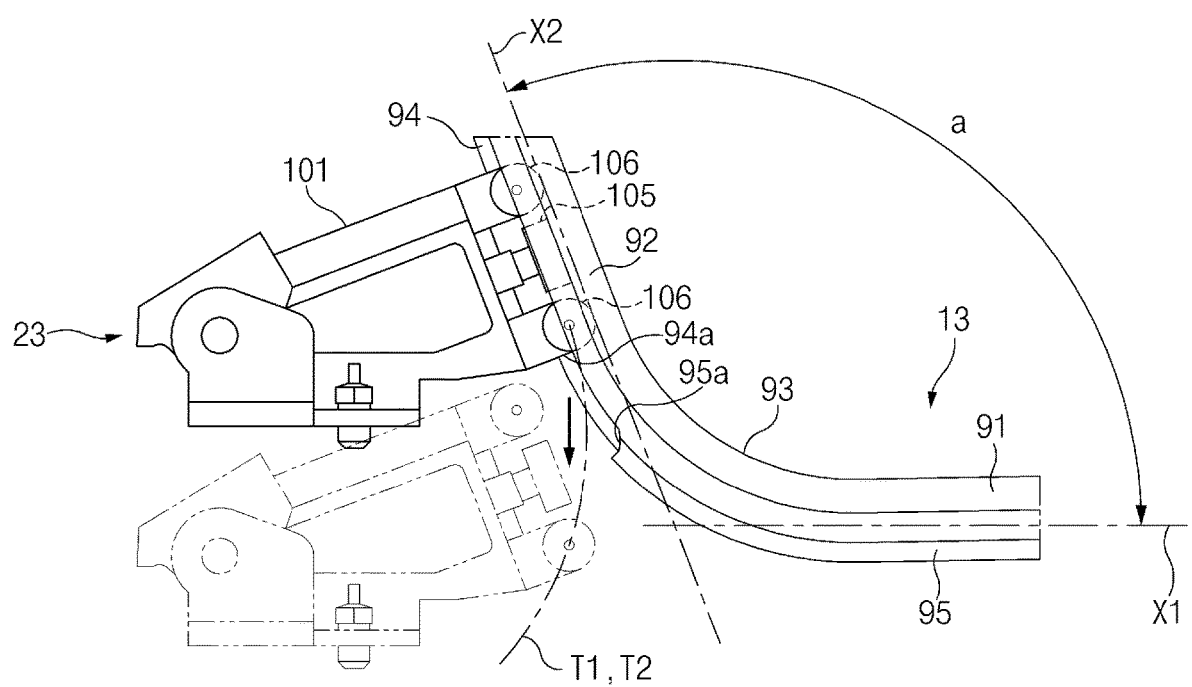
FIG. 16 illustrates an operation in which a center roller unit is released from a swing guide of a center rail.

A front end 95a of the stopper wall 95 of the sliding guide 91 and a rear end 94a of the guide projection 94 may be positioned so as not to interfere with the swing trajectories T1 and T2 of the vehicle door 5. In addition, as illustrated in FIG. 16, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, so that the center roller unit 23 may easily be released from the swing guide 92 of the center rail 13 or may easily be held in the swing guide 92 of the center rail 13. The center rail 13 may include a space 98 allowing the rollers 105 and 106 of the center roller unit 23 to be released from the center rail 13 or be held in the center rail 13 when the vehicle door 5 swings in the swing mode. The space 98 may be defined between the front end 95a of the stopper wall 95 and the rear end 94a of the guide projection 94 as the front end 95a of the stopper wall 95 and the rear end 94a of the guide projection 94 are spaced apart from each other. Thus, there is no interference when the rollers 105 and 106 of the center roller unit 23 are released from the center rail 13 or are held in the center rail 13 in the swing mode.

FIGS. 1 to 16 illustrate the vehicle door opening and closing apparatus according to exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 17:
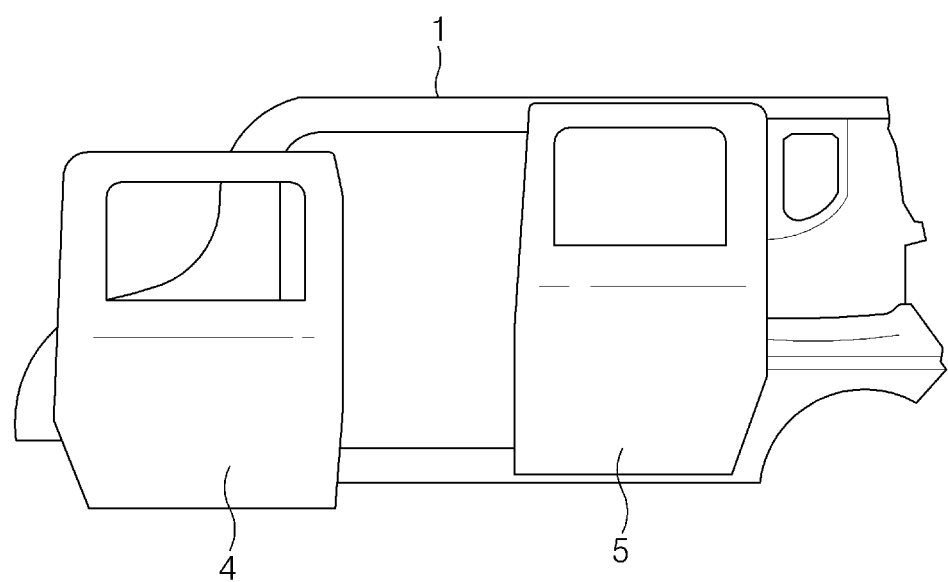
FIG. 17 illustrates a vehicle door opening and closing apparatus according to an exemplary embodiment of the present disclosure, which is applied to a front door of a vehicle, in a state in which the front door is opened in sliding mode.
Figure 18:
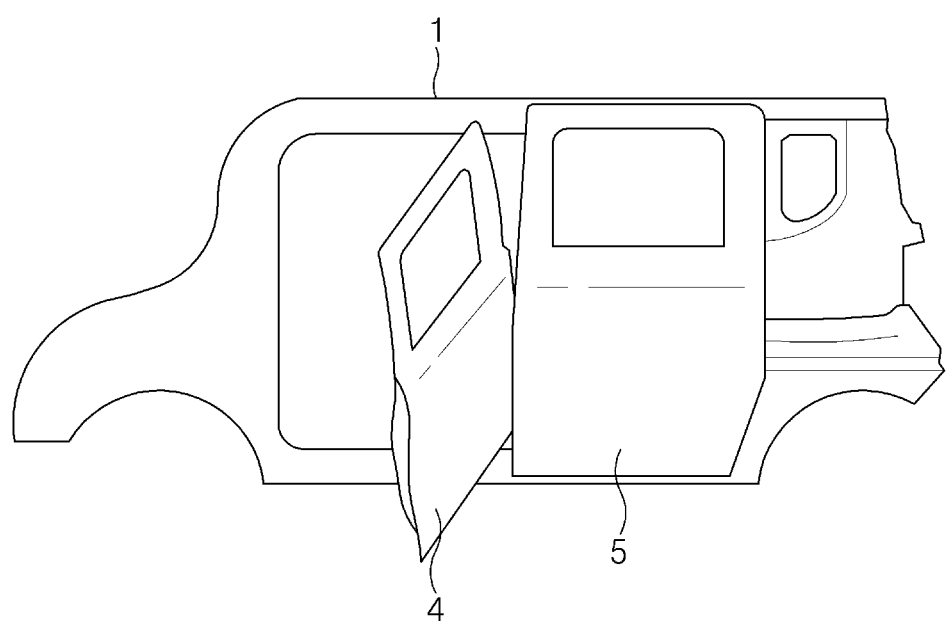
FIG. 18 illustrates a state in which the front door of FIG. 17 is opened in swing mode.

FIGS. 17 and 18 illustrate the vehicle door opening and closing apparatus according to exemplary embodiments of the present disclosure applied to the front door 4. FIG. 17 illustrates a state in which the front door 4 is opened in the sliding mode, and FIG. 18 illustrates a state in which the front door 4 is opened in the swing mode.

Figure 19:
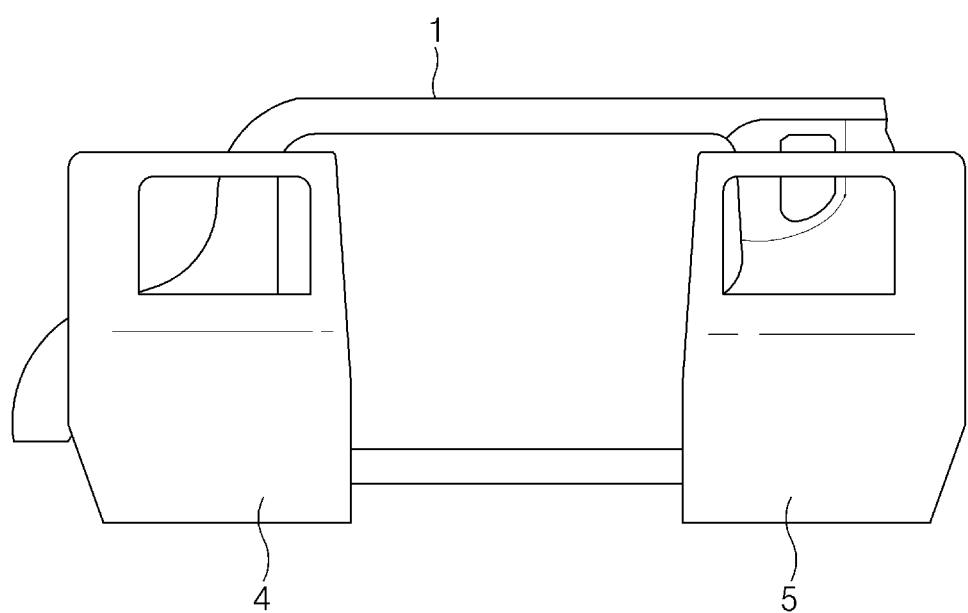
FIG. 19 illustrates a vehicle door opening and closing apparatus according to an exemplary embodiment of the present disclosure, which is applied to a front door and a rear door of a vehicle, in a state in which the front door and the rear door are opened in sliding mode.
Figure 20:
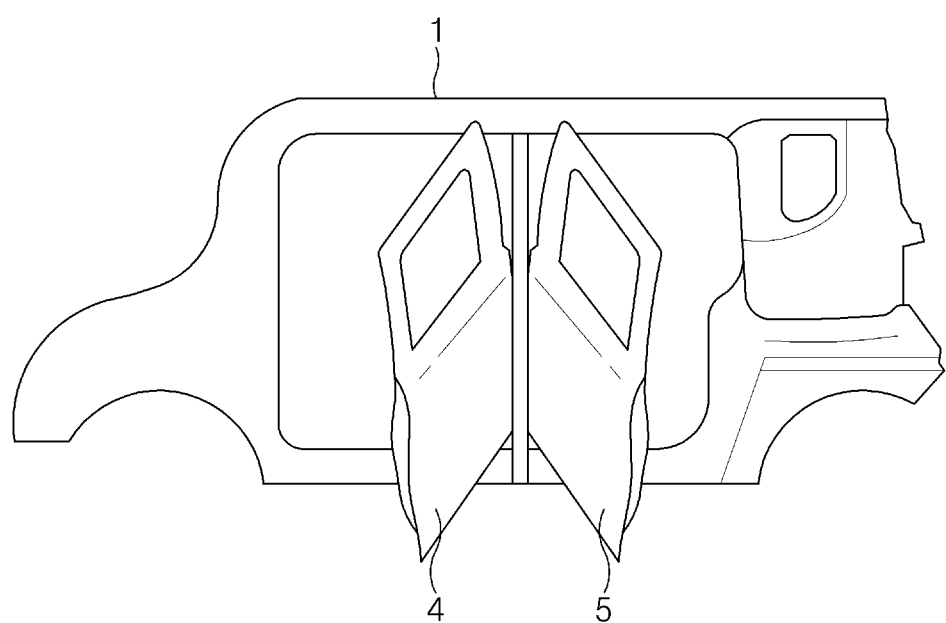
FIG. 20 illustrates a state in which the front door and the rear door of FIG. 19 are opened in swing mode.

FIGS. 19 and 20 illustrate the vehicle door opening and closing apparatus according to exemplary embodiments of the present disclosure applied to both the front door 4 and the rear door 5. FIG. 19 illustrates a state in which the front door 4 and the rear door 5 are opened in the sliding mode, and FIG. 20 illustrates a state in which the front door 4 and the rear door 5 are opened in the swing mode.

As set forth above, the vehicle door opening and closing apparatus according to exemplary embodiments of the present disclosure may perform the opening and closing operation of the vehicle door by selectively switching the sliding mode and the swing mode, thereby satisfying consumer need and convenience. In addition, it may select the opening and closing operation of the vehicle door according to user preference and surroundings of the vehicle, thereby improving convenience and quality.

In terms of vehicle specifications, the vehicle door opening and closing structure may be standardized for various vehicles, regardless of vehicle model. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle door opening and closing apparatus, comprising:
   a vehicle door;
   a rail mounted on a vehicle body; and
   a roller unit mounted on the vehicle door, and configured to move along the rail,
   wherein the roller unit allows the vehicle door to open and close in either a sliding mode, in which the vehicle door slides along the rail, or a swing mode, in which the vehicle door swings in a predetermined position of the rail;
   wherein the roller unit includes a roller bracket having a roller configured to roll along the rail, and a body connecting the roller bracket and the vehicle door.

2. The vehicle door opening and closing apparatus according to claim 1,
   wherein the roller unit has a rotation axis and includes a hold lock,
   wherein the roller unit is releasably held in the predetermined position of the rail by the hold lock, wherein the vehicle door swings around the rotation axis when the roller unit is held in the predetermined position of the rail by the hold lock, and wherein the vehicle door slides along the rail when the roller unit is released by the hold lock.

3. The vehicle door opening and closing apparatus according to claim 1, wherein the body includes a first end portion to which the roller bracket is connected, and a second end portion to which the vehicle door is connected.

4. The vehicle door opening and closing apparatus according to claim 3, wherein the first end portion of the body is pivotally connected to the roller bracket through a pivot pin, and the rotation axis is defined by the pivot pin.

5. The vehicle door opening and closing apparatus according to claim 4, wherein the body has a pivot lug protruding from the first end portion toward the roller bracket, and the pivot lug is pivotally connected to the roller bracket through the pivot pin.

6. The vehicle door opening and closing apparatus according to claim 3, wherein the second end portion of the body is fixed to the vehicle door.

7. The vehicle door opening and closing apparatus according to claim 3, wherein the first end portion of the body is fixed to the roller bracket.

8. The vehicle door opening and closing apparatus according to claim 3, wherein the second end portion of the body is pivotally connected to the vehicle door through a pivot pin, and the rotation axis is defined by the pivot pin.

9. The vehicle door opening and closing apparatus according to claim 8, wherein the vehicle door has a pivot lug protruding toward the body, and the second end portion of the body is pivotally connected to the pivot lug through the pivot pin.

10. The vehicle door opening and closing apparatus according to claim 1, further comprising:

a center rail extending from an edge of a door aperture of the vehicle body; and a center roller unit guided along the center rail, wherein the center roller unit is mounted on a rear end of the vehicle door.

11. The vehicle door opening and closing apparatus according to claim 10, wherein the center rail includes a sliding guide configured to guide the center roller unit when the vehicle door slides in the sliding mode, and a swing guide configured to guide the center roller unit when the vehicle door swings in the swing mode.

12. The vehicle door opening and closing apparatus according to claim 11, wherein the sliding guide extends in a longitudinal direction of a vehicle, and the swing guide extends toward an interior space of the vehicle.

13. The vehicle door opening and closing apparatus according to claim 12, wherein the sliding guide has a stopper wall configured to prevent the center roller unit from being separated from the sliding guide.

14. The vehicle door opening and closing apparatus according to claim 13, wherein the swing guide has a guide projection configured to guide a movement of the center roller unit.

15. The vehicle door opening and closing apparatus according to claim 14, wherein the center rail includes a space allowing the center roller unit to be released from the center rail or be held in the center rail when the vehicle door swings in the swing mode, and the space is defined between the stopper wall and the guide projection.

16. The vehicle door opening and closing apparatus according to claim 11, wherein an angle of intersection between an axis of the sliding guide and an axis of the swing guide is an obtuse angle.

* * * * *